(12) United States Patent
Nakayoshi et al.

(10) Patent No.: US 6,897,930 B2
(45) Date of Patent: May 24, 2005

(54) DISPLAY DEVICE

(75) Inventors: Yoshiaki Nakayoshi, Ooamishirasato (JP); Kazuhiko Yanagawa, Mobara (JP)

(73) Assignee: Hitachi, Ltd., Tokyo (JP)

(*) Notice: Subject to any disclaimer, the term of this patent is extended or adjusted under 35 U.S.C. 154(b) by 1 day.

(21) Appl. No.: 10/347,328

(22) Filed: Jan. 21, 2003

(65) Prior Publication Data

US 2003/0137615 A1 Jul. 24, 2003

(30) Foreign Application Priority Data

Jan. 22, 2002 (JP) ........................................ 2002-012927

(51) Int. Cl.[7] ........................................... G02F 1/1343
(52) U.S. Cl. ........................ 349/139; 349/106; 257/59
(58) Field of Search ............................... 349/106, 139, 349/43; 257/59, 72

(56) References Cited

U.S. PATENT DOCUMENTS

| | | | |
|---|---|---|---|
| 6,522,379 B1 * | 2/2003 | Ishihara et al. | 349/139 |
| 6,667,790 B2 * | 12/2003 | Yanagawa et al. | 349/139 |
| 6,714,274 B2 * | 3/2004 | Aoki et al. | 349/139 |
| 6,724,452 B1 * | 4/2004 | Takeda et al. | 349/139 |

* cited by examiner

*Primary Examiner*—Toan Ton
(74) *Attorney, Agent, or Firm*—Antonelli, Terry, Stout & Kraus, LLP (57) ABSTRACT

In order to suppress open-circuit of drain signal lines, a liquid display device is disclosed, which includes a first gate signal line and a second gate signal line, a first drain signal line and a second drain signal line, a first pixel region comprising a first thin film transistor connected to the first gate signal line and the first drain signal line, a second pixel region comprising a second thin film transistor connected to the first gate signal line and the second drain signal line, a third pixel region comprising a third thin film transistor connected to the second gate line and the first pixel region, the second pixel region and the third pixel region form one dot of color display and the first drain signal line and the second drain signal line are curved at a first angle between the first gate signal line and the second gate signal line.

24 Claims, 10 Drawing Sheets

DISPLAY DEVICE

BACKGROUND OF THE INVENTION

1. Field of the Invention

The present invention relates generally to liquid crystal display devices and, more particularly, to color liquid crystal display devices of the active matrix type.

2. Description of Related Art

Active-matrix liquid crystal display devices are typically designed to define, as pixel regions, regions which are surrounded by a plurality of parallel-provided gate signal transmission lines and a plurality of parallel drain signal transfer lines crossing these gate signal lines on the liquid crystal side surface of one substrate of respective substrates that are disposed to oppose each other with a layer of liquid crystal material interposed therebetween.

Each pixel region is equipped with a switching element which is activated by a scanning signal from a gate signal line and a pixel electrode to which an image signal is supplied from a drain signal line through this switching element.

In addition, in such liquid crystal display devices, when letting them perform color display operations, a color filter is formed at each pixel on the liquid crystal side surface of, for example, the other substrate of the above-noted respective substrates, wherein this color filter is arranged to use filters exhibiting red (R), green (G) and blue (B) for respective ones of three pixels which neighbor upon one another.

An arrangement called the delta layout is known, wherein a group of pixels along a gate signal line are disposed in such a manner as to let each pixel of an even-numbered linear array or line, for example, be shifted or offset by ½ pixel distance with respect to each pixel of an odd-numbered line while at the same time letting three color-display pixels consisting of two mutually neighboring pixels of an even-numbered line and a single pixel of an odd-numbered line which is in close proximity thereto and also two neighboring pixels of the odd-numbered line and a single pixel of the even-numbered line adjacent thereto, which disposed alternately.

A liquid crystal display device with such delta layout is capable of improving the display quality by disposing respective three color-display pixels at respective top points or apexes of a triangle and also blurring the contour thereof. However, since the liquid crystal display device arranged in this way is arranged to shift the pixel group of an even-numbered line by ½ pixel distance with respect to the pixel group of an odd-numbered line in the way described above, a drain signal line which runs between respective pixels must be formed to have several perpendicularly bent or curved portions. This structure has been actualized as inconvenient points occurring due to the quest for higher definition of liquid crystal display devices in the recent years. That is wire breakage or an "open-circuit" is easier to generate at the aforementioned curved portions which is accompanied with a decrease in line width of the drain signal lines. It is considerd that this is caused by an increase in etching rate at the curved portions of the drain signal lines when compared to that at the other portions in cases where the drain signal lines are fabricated and patterned through selective etching by photolithography techniques, for example.

SUMMARY OF THE INVENTION

The present invention has been made in view of the aforedescribed technical background and an object is to provide a liquid crystal display device capable of suppressing an unwanted open-circuit of drain signal lines.

According to a first embodiment of a liquid crystal display device of the present invention, for example, includes a first gate signal line and a second gate signal line and a first drain signal line and a second drain signal line and a first pixel region comprising a first thin film transistor connected to the first gate signal line and the first drain signal line and a second pixel region comprising a second thin film transistor connected to the first gate signal line and the second drain signal line and a third pixel region comprising a third thin film transistor connected to the second gate line, The first pixel region, the second pixel region and the third pixel region form one dot of color display and the first drain signal line and the second drain signal line are curved at a first angle between the first gate signal line and the second gate signal line.

According to a modification of the first embodiment of the liquid crystal display device of the present invention, for example, the first angle is an obtuse angle and the first drain signal line and the second drain signal line comprise straight line shape at portions crossing the first gate line and the second gate line.

According to another modification of the first embodiment of the liquid crystal display device of the present invention, for example, the third thin transistor of the third pixel region is connected to the second gate signal line and the second drain signal line. According to a further modification of the first embodiment of the liquid crystal display device of the present invention, for example, the first pixel region displays red color with a red color filter, the second pixel region displays green color with a green color filter and the third pixel region displays blue color with a blue color filter. According to another modification of the first embodiment of the present invention, for example, the first pixel region displays red color with a red color filter, the second pixel region displays blue color with a blue color filter and the third pixel region displays green color with a green color filter.

According to another modification of the first embodiment of the present invention, for example, the third thin transistor of the third pixel region is connected to the second gate signal line and the first drain signal line. According to a further modification of the first embodiment of the liquid crystal display device of the present invention, for example, the first pixel region displays red color with a red color filter, the second pixel region displays green color with a green color filter and the third pixel region displays blue color with a blue color filter. According to another modification of the first embodiment, for example, the first pixel region displays red color with a red color filter, the second pixel region displays blue color with a blue color filter and the third pixel region displays green color with a green color filter.

According to another modification of the first embodiment of the liquid crystal display device of the present invention, for example, further includes a third gate signal line, the first drain signal line and the second drain signal line are curved at a second angle between the first gate signal line and a third gate signal line. According to a further modification of the first embodiment of the liquid crystal display device of the present invention, for example, a direction of the second angle is inversed from a direction of the first angle and the first drain signal line and the second drain signal line comprise straight line shape at portions crossing the first gate line, the second gate line and the third gate signal line. According to another modification of the first embodiment of the present invention, for example, the first angle is equal to the second angle. According to another modification of the first embodiment of the present invention, for example, the first angle and the second angle are obtuse angle.

According to another modification of the first embodiment of the liquid crystal display device of the present invention, for example, the first drain signal line and the second drain signal line are formed into a zigzag shape between the first gate signal line and the second gate signal line. According to a further modification of the first embodiment of the liquid crystal display device of the present invention, for example, includes a third gate signal line, the first drain signal line and the second drain signal line are formed into a zigzag shape between the first gate signal line and the third gate signal line. According to another modification of the first embodiment of the liquid crystal display device of the present invention, for example, the first drain signal line and the second drain signal line comprise straight line shape at portions crossing the first gate line, the second gate line and the third gate signal line.

According to another modification of the first embodiment of the liquid crystal display device of the present invention, for example, each pixel region comprises a pixel electrode having portions which extend in parallel to portions of the first drain signal line and the second drain signal line.

According to another modification of the first embodiment of the liquid crystal display device of the present invention, for example, includes a counter electrode formed on the first drain signal line and the second drain signal line, wherein the counter electrode includes portions which extend in parallel to portions of the first drain signal line and the second drain signal line.

According to a second embodiment of a liquid crystal device of the present invention, for example, there is provided a plurality of pixel regions surrounded by a plurality of gate signal lines and a plurality of drain signal lines crossing the gate signal lines on a liquid crystal side surface of one substrate of respective substrates disposed so as to oppose each other with a liquid crystal layer interposed therebetween, each pixel region comprising a switching element activated by a scan signal from one of the gate signal lines and a pixel electrode to which an image signal from one of the drain signal lines is supplied through the switching element.

Three color-display pixels are formed of two adjacent pixel regions of an even-numbered line of display pixels extending along one of the gate signal lines and a single pixel region of an odd-numbered line of display pixels adjacent thereto and from two adjacent pixel regions of the odd-numbered line of display pixels and a single pixel region of the even-numbered line of display pixels adjacent thereto which are disposed alternately.

The drain signal lines are bent at a first obtuse angle while extending between the pixel regions of the even-numbered line of display pixels and then extended straightly therefrom and thereafter extended so as to bent at a second obtuse angle in an opposite direction to said first obtuse angle while extending between pixel regions of the odd-numbered line of display pixels.

According to a modification of the second embodiment of the liquid crystal display device of the present invention, for example, the pixel region includes a counter electrode for enabling generation of an electric field between the counter electrode and the pixel electrode. According to a further modification of the second embodiment of the liquid crystal display device of the present invention, for example, the pixel electrode is formed between the liquid crystal side surface of one substrate and a protective film formed of an organic material layer, and the counter electrode includes a portion which overlaps the drain signal line on an upper layer side of the protective film and is formed integrally with a counter voltage signal line which overlaps the gate signal line.

According to another modification of the second embodiment of the liquid crystal display device of the present invention, for example, the plurality of drain signal lines are formed to have straight line shape portions which cross the gate signal line.

According to a third embodiment of a liquid crystal device of the present invention, for example, there is provided a plurality of pixel regions surrounded by a plurality of parallel-provided gate signal lines and a plurality of parallel-provided drain signal lines crossing the gate signal lines on a liquid crystal side surface of one substrate of respective substrates disposed so as to oppose each other with a liquid crystal layer interposed therebetween, each pixel region comprises a switching element activated by a scan signal from one of the plurality of gate signal lines and a pixel electrode to which an image signal from one of the plurality of drain signal lines is supplied through this switching element.

Three color-display pixels are formed from of two adjacent pixels of an even-numbered line along of display pixels extending along one of the gate signal lines and a single pixel of an odd-numbered line of display adjacent thereto and two adjacent pixel regions of the odd-numbered line and a single pixel region of the even-numbered line of display pixels adjacent thereto which are disposed alternately.

Each of the drain signal lines is formed into a zigzag shape in such a manner as to be bent at at least first and second obtuse angles in opposite directions while extending between the pixel regions of the even-numbered line of display pixel and then extended straightly therefrom and thereafter extended so that it is bent at at least third and fourth obtuse angles in opposite directions while extending between the pixel regions of the odd-numbered line.

According to a modification of the third embodiment of the liquid crystal display device of the present invention, for example, the drain signal line is formed to have a straight line shape portion which cross the gate signal line.

It should be noted that the present invention is not limited to the arrangements stated above and is modifiable and alterable in a variety of ways without departing from the technical ideas of the invention.

DESCRIPTION OF THE PREFERRED EMBODIMENTS

Embodiments of the liquid crystal display device in accordance with the instant invention will be explained with reference to the accompanying drawings below.
Embodiment 1.
<<Overall Arrangement>>

Figure 2A:
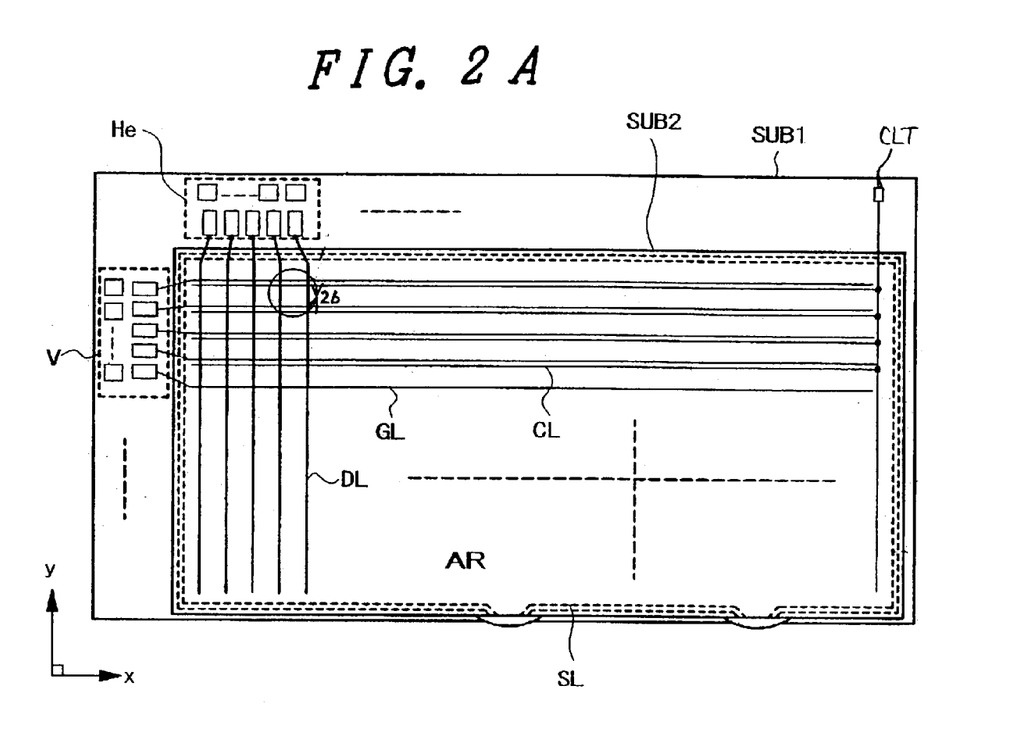
FIG. 2A is a view of the liquid crystal display device in accordance with this invention.
Figure 2B:
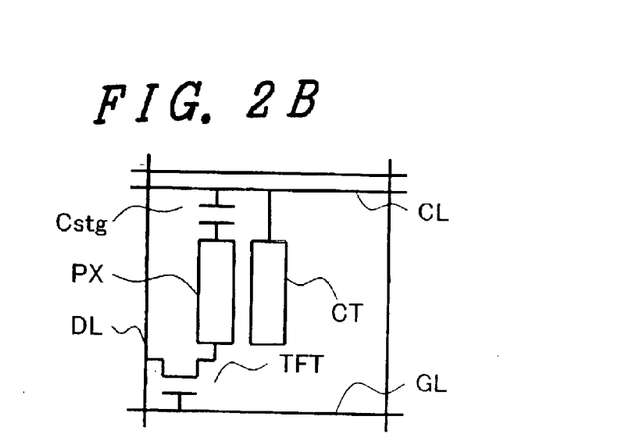
FIG. 2B is an enlarged view of a portion thereof.

FIG. 2A is an entire configuration diagram showing one embodiment of the liquid crystal display device in accordance with the present invention and FIG. 2B is an equivalent circuit, it illustrates the circuit diagram corresponding to the actual geometrical layout.

In FIG. 2A, there is a pair of transparent substrates SUB1, SUB2 which are disposed to oppose each other with a layer of liquid crystal material interposed therebetween, wherein the liquid crystal material is sealed by a seal material SL which also functions as fixation of the transparent substrate SUB2 with respect to the transparent substrate SUB1.

On a liquid crystal side surface of the transparent substrate SUB1 which is surrounded by the seal material SL, gate signal lines GL which extend in its "x" direction and are provided in parallel to "y" direction and drain signal lines DL which extend in the y direction and parallel-provided in the x direction are formed. Regions which are surrounded by respective gate signal lines GL and respective drain signal lines DL are arranged to make up pixel regions; and simultaneously, a matrix-like ensemble of these respective pixel regions constitutes a liquid crystal display section AR. Additionally, formed in each of the respective pixel regions which are parallel-provided in the x direction is a common counter voltage signal line CL which runs within such respective pixel regions. This counter voltage signal line CL becomes a signal line used to supply a voltage which becomes a reference with respect to image signals to a later-described counter electrode CT of each pixel region.

FIG. 2B shows a circuit of each pixel region. In each pixel region, a thin-film transistor TFT which is rendered operative or activated by a scan signal from its one-side gate signal line GL and a pixel electrode PX to which an image signal is supplied through this thin-film transistor TFT from a one-side drain signal line DL are formed. This pixel electrode PX is designed to permit creation of an electric field between it and the counter electrode CT as connected to the counter voltage signal line CL, which electric field is used to control the optical transmissivity of the liquid crystals.

Respective terminate ends of the gate signal lines GL are extended to go beyond the seal material SL, which ends are designed to make up the terminals to which output terminals of a vertical scan drive circuit V are connected. In addition, input terminals of the vertical scan drive circuit V are such that signals from a printed circuit board as disposed outside of a liquid crystal display panel are input thereto. The vertical scan drive circuit V consists essentially of a plurality of semiconductor devices, wherein a plurality of mutually neighboring gate signal lines are grouped together with a single semiconductor device assigned on a per-group basis.

Similarly, respective terminate ends of the drain signal lines DL are extended beyond the seal material SL, which ends are designed to constitute the terminals to which output terminals of an image signal drive circuit He are connected. Additionally, input terminals of the image signal drive circuit He are such that signals from a printed circuit board as disposed outside of the liquid crystal display panel are input thereto. This image signal drive circuit He also consists essentially of a plurality of semiconductor devices, wherein a plurality of mutually neighboring drain signal lines are grouped together with a single semiconductor device assigned on a per-group basis.

The above-noted counter voltage signal lines CL which are in common to respective pixel regions as parallel-provided in the x direction are commonly connected together at an edge portion on the right side in FIG. 2A, wherein a connection line thereof is extended beyond the seal material SL and thus makes up a terminal CLT at the extended end thereof. From this terminal CLT, a voltage is supplied which becomes a reference with respect to image signals.

The respective gate signal lines GL are designed so as to be sequentially selected, one at a time, by a scan signal from the vertical scan drive circuit V. Additionally, an image signal is supplied by the image signal drive circuit He to each of the respective drain signal lines DL in a way synchronized with the selection timing of the gate signal lines GL.

Although in the above-described embodiment, the vertical scan drive circuit V and the image signal drive circuit He are semiconductor devices which are mounted on the transparent substrate SUB1, these may alternatively be semiconductor devices of the type using the so-called tape carrier scheme which are connected while bridging between the transparent substrate SUB1 and the printed circuit board: Further, in case the semiconductor layer of the thin-film transistor TFT is comprised of a polycrystalline silicon or poly-silicon (p-Si), the circuits may be ones that include semiconductor elements made of the polysilicon which are formed on the surface of transparent substrate SUB1 along with a wiring layer(s).

<<Pixel Arrangement>>

Figure 3A:
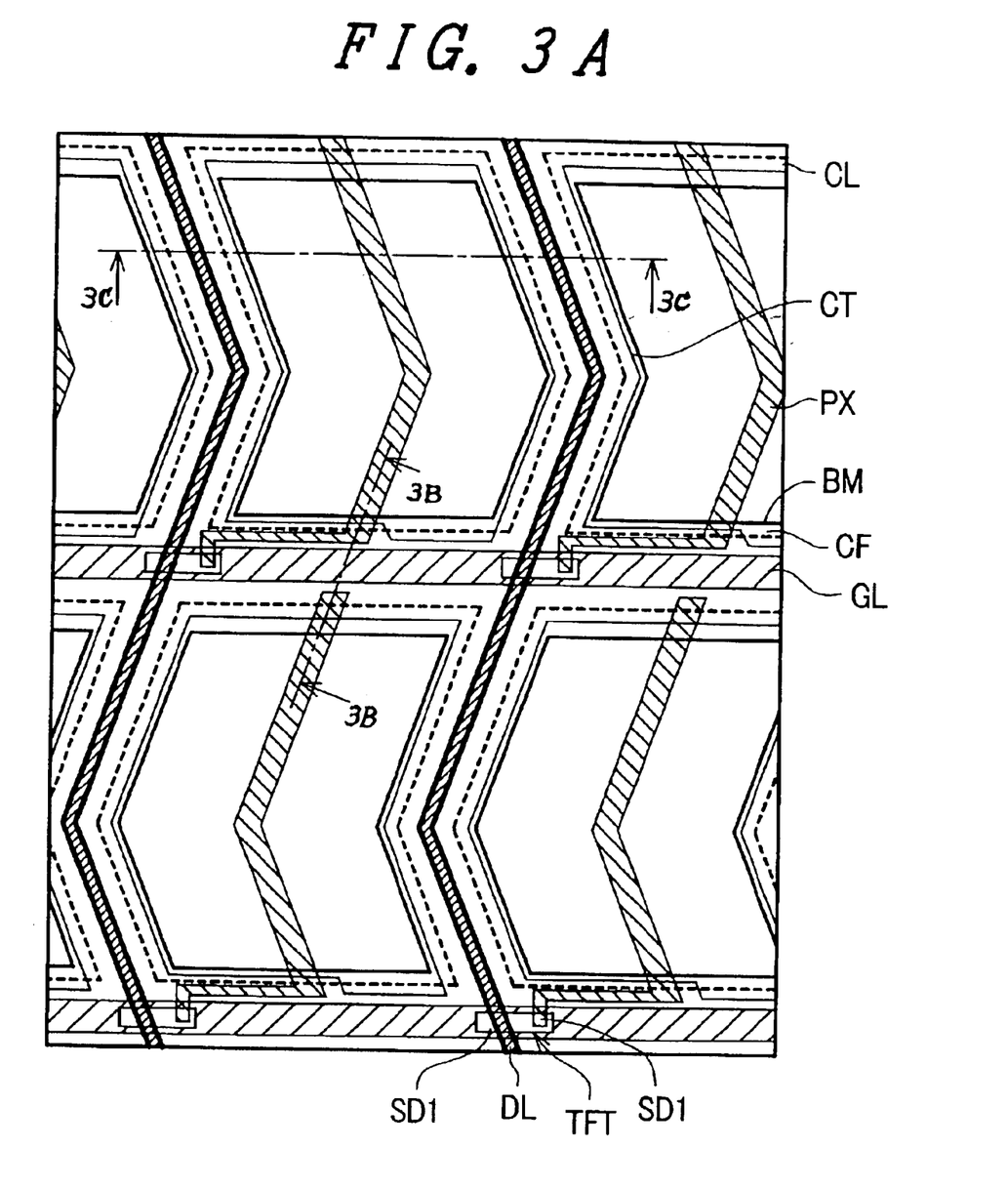
FIG. 3A is a plan view of a pixel of the liquid crystal display device in accordance with the invention.
Figure 3B:
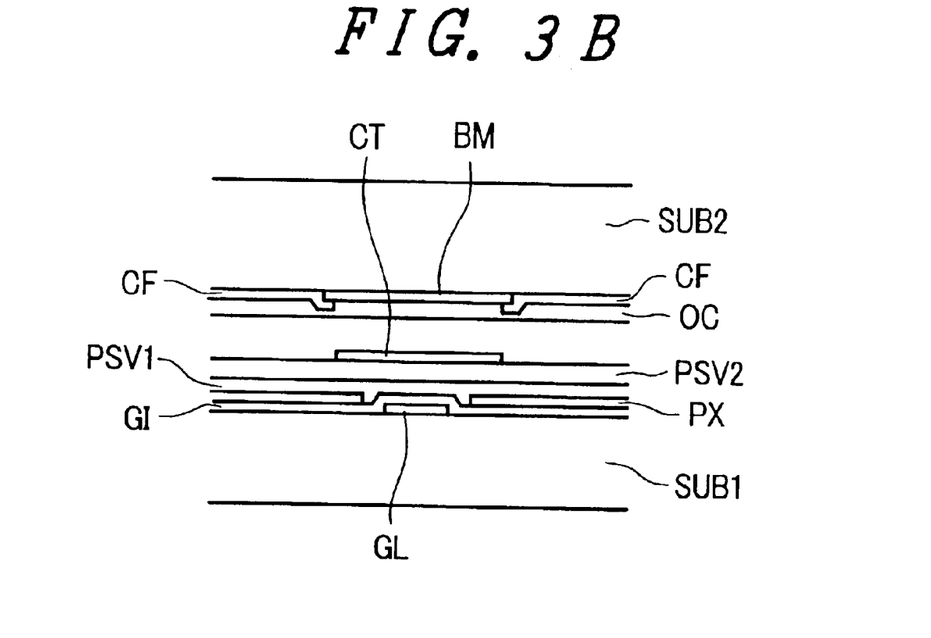
FIG. 3B is a sectional view taken along line 3B—3B of FIG. 3A.
Figure 3C:
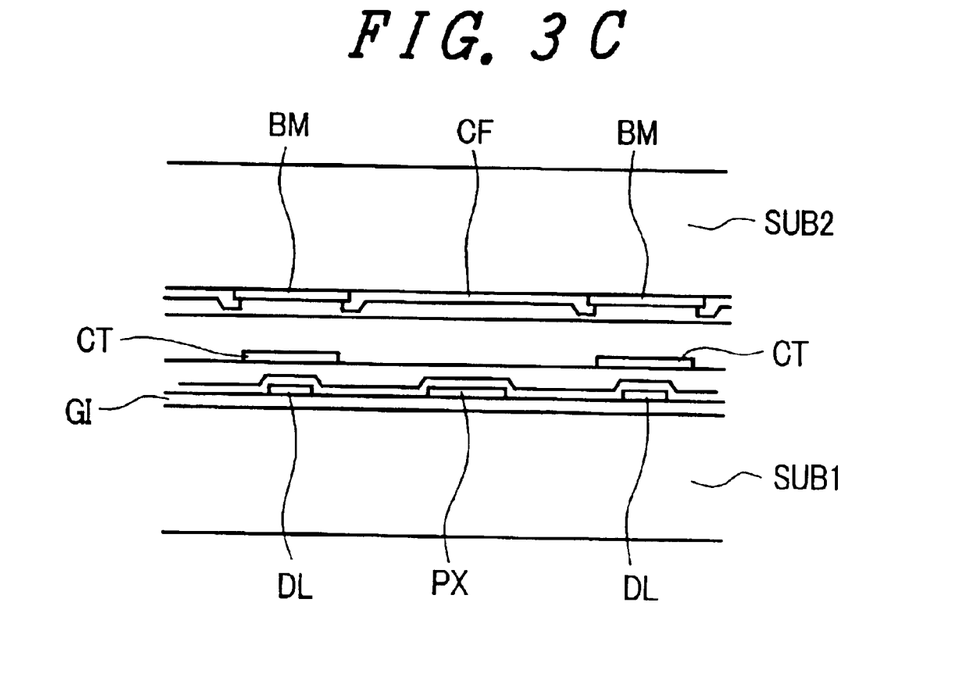
FIG. 3C is a sectional view taken along line 3C—3C of FIG. 3A.

FIG. 3A is a plan view diagram showing one embodiment of the pixel region, FIG. 3B is a cross-sectional diagram as taken along line 3B—3B of FIG. 3A, and FIG. 3C is a sectional diagram along line 3C—3C of FIG. 3A. A pair of gate signal lines GL which extend in the x direction and are parallel-provided in the y direction are formed on the liquid crystal side surface of the transparent substrate SUB1. The gate signal lines GL surround a substantially rectangular region together with a pair of drain signal lines DL as will be described later in the description, wherein this region is arranged as a pixel region.

A dielectric film GI made, for example, of SiN is formed on the surface of the transparent substrate SUB1 with the gate signal lines GL formed thereon so as to cover the gate signal lines GL also as shown in FIG. 3B. This dielectric film GI functions as an interlayer dielectric film with respect to the gate signal lines GL in the formation region of a drain signal line DL to be later described and functions, in the formation region of a thin-film transistor TFT to be later described, as its gate insulation film. A semiconductor layer AS (not shown) made, for example, of amorphous Si is formed on the surface of this dielectric film GI in such a manner that it partly overlaps the gate signal lines GL. The semiconductor layer AS forms part of the thin-film transistor TFT as shown in FIG. 3A; thus it is possible by forming a drain electrode SD1 and a source electrode SD2 on its upper surface to constitute a MIS transistor of the reverse stagger structure with part of the gate signal line as its gate electrode. The drain electrode SD1 and source electrode SD2 are to be formed simultaneously during formation of the drain signal lines DL.

More specifically, the drain signal lines DL which extend in the y direction and are parallel-provided in the x direction are formed; then, part thereof is superposed on the upper surface of the semiconductor layer AS to thereby form the drain electrode SD1 while being spaced apart from this drain electrode SD1 by a distance corresponding to the channel length of thin-film transistor TFT to thereby form the source electrode SD2. The drain signal lines DL are formed into a zigzag-shaped pattern, as shown in FIG. 3A by letting them bend or curve at an obtuse angle while running between pixels in a first linear array or line of the pixels which are parallel-provided in the x direction and then simply extend straightly and thereafter curve at an obtuse angle toward the opposite direction to the curvature while running between pixels of a second line and further similarly be designed to run in the case of running between pixels of a third line and those of a fourth line. Due to this configuration, the shape of a pixel region which is surrounded by neighboring drain signal lines DL and neighboring gate signal lines GL is formed as a polygon (hexagon in FIG. 3A).

The source electrode SD2 is formed integrally with the pixel electrode PX to be formed within the pixel region. More specifically, the pixel electrode PX is structured from a single electrode which extends in the y direction at a central portion of the pixel region and is formed to have a curved portion which becomes parallel to the drain signal line DL. In other words, the pixel electrode PX is formed into a pattern to be obtained in the case of simply shifting the drain signal line DL toward the x direction.

A protective film PSV is formed over the surface of the transparent substrate SUB1 on which the thin-film transistors TFT, drain signal lines DL, drain electrodes SD1, source electrodes SD2 and pixel electrodes PX are formed in the way stated above. The protective film PSV is a film for avoiding direct contact between the thin-film transistors TFT and liquid crystals, which is arranged to preclude any possible degradation of the characteristics of such thin-film transistors TFT. The protective film PSV is comprised of a multilayer structure with sequential lamination of a protective film PSV1 which is formed for example of an inorganic material layer such as SiN and a protective film PSV2 formed of an organic material layer such as resin or the like. The use of at least the organic material layer as the protective film PSV is aimed at reduction of the dielectric constant of the protective film per se.

A counter electrode CT is formed at an upper surface of the protective film PSV2. The counter electrode CT is made up of a plurality of electrodes (two in FIG. 3C) which extend in the y direction and are parallel-provided in the x direction in a similar manner to that of the pixel electrode PX (FIG. 3A), wherein these respective electrodes are positioned so that the pixel electrode PX is between them when observed planarly. More specifically, the counter electrodes CT and the pixel electrodes PX are laid out at equal intervals in a region spanning from a drain signal line on one side to a drain signal line on the other side in the order of sequence of a counter electrode, a pixel electrode and a counter electrode.

The counter electrode CT is also formed to have curved portions as to become parallel with the above-noted pixel electrode PX. In other words, the counter electrode CT is formed into a pattern which is obtainable in the case of simply shifting the pixel electrode PX toward the x direction.

The counter electrodes CT which are placed on the both sides of a pixel region are such that part of them is formed to overlap a drain signal line DL and also is formed in common to a corresponding counter electrode CT in its neighboring pixel region. In other words, the counter electrode CT overlaps the drain signal line DL with its center axis substantially made identical thereto, wherein the counter electrode CT is formed so that its width is greater than that of the drain signal line DL. The left-side counter electrode CT relative to the drain signal line DL is designed to constitute one of respective counter electrodes CT of the left-side pixel region whereas the right-side counter electrode CT makes up one of respective counter electrodes CT of the right-side pixel region.

By forming over the drain signal line DL, a counter electrode CT which is greater in width than the drain signal line DL, an effect is obtained as to the capability to avoid unwanted termination of electric flux lines from this drain signal line DL at the counter electrode CT and then termination thereof at the pixel electrode PX. Because in case the electric flux lines from the drain signal line DL terminate at the pixel electrode PX, this would result in undesired creation of noise.

Each counter electrode CT formed of an electrode group is formed integrally with a counter voltage signal line CL which is formed to sufficiently cover the gate signal line GL and is made of the same material, wherein a reference voltage is to be supplied via this counter voltage signal line CL. The counter voltage signal line CL is formed to sufficiently cover the gate signal line GL so that one end portion of the pixel electrode PX is positioned at a portion which is overextended from the gate signal line GL, whereby a capacitive element Cstg with the protective film PSV as its dielectric film is formed between the pixel electrode PX and the counter voltage signal line CL. The capacitive element Cstg is designed so that it functions to relatively long accumulate or store therein an image signal as has been supplied to the pixel electrode PX by way of example.

Over the upper surface of the transparent substrate SUB1 on which the counter electrodes CT are formed, an orientation film (not shown) is formed so as to also cover the counter electrodes CT also. This orientation film is a film which is in direct contact with the liquid crystals and which is designed to determine the initial orientation or alignment directions of such liquid crystal molecules owing to the rubbing which was formed on the surface of the orientation film.

The transparent substrate SUB1 thus arranged is disposed to oppose the transparent substrate SUB2 with the liquid crystal layer sandwiched therebetween, with a black matrix BM formed on the liquid crystal side surface of such transparent substrate SUB2 as shown in FIGS. 3B and 3C. The black matrix BM is formed so that it opposes the counter electrodes CT (counter voltage signal lines CL) and has a width which is slightly greater than a width of the counter electrode. The black matrix BM is formed as a pattern with openings formed therein, which expose central portions of pixel regions excluding tiny regions at the periphery thereof. Further, color filters CF are formed at the openings of the black matrix BM so as to cover the openings.

<<Color Filter>>

Figure 1:
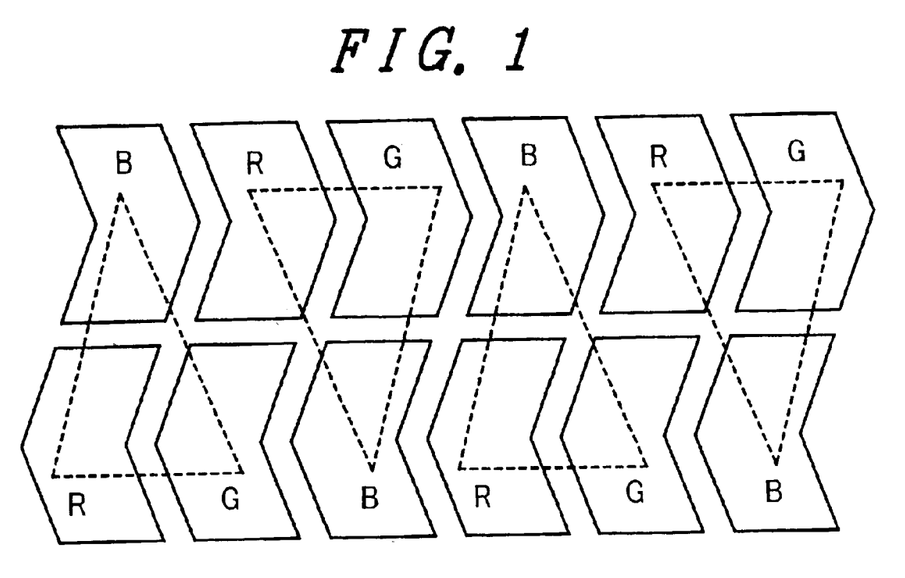
FIG. 1 is a schematic explanation diagram of a liquid crystal display device in accordance with the present invention.

FIG. 1 shows mutually neighboring 2×6 pixels of respective pixels of the liquid crystal display section AR comprising the pixels, by their outer contour lines, while indicating red, green and blue colors of the color filters CF of each pixel by "R," "G" and "B," respectively. In FIG. 1, respective pixels of the first line selected from among respective pixels which are disposed into two linear arrays or "lines" are designed to serve respective colors in the order of B, R, G, B, R . . . from the left side to the right side in the figure. Additionally, respective pixels of the second line are designed to take charge of respective colors in the order of R, G, B, R, G . . . from the left side to the right side in the figure.

A pixel located nearest to the left side (first pixel) of the first line and the left-nearest (first) and second pixels of the second line are designed to make up a single pixel (one dot) for color displaying in FIG. 1. In addition, respective pixels of the second and third ones of the first line and the third pixel of the second line constitute a single pixel (one dot) for color displaying. These a single pixel for color display consists of respective pixels which are disposed to form a triangle having its base line as defined by the mutually neighboring pixels of the second line and a top point or vertex defined by a single pixel of the first line adjacent thereto and also respective pixels which are disposed to form a triangle having its base as defined by the neighboring pixels of the first line and a vertex defined by a single pixel of the second line adjacent thereto, wherein they are disposed alternately.

This layout of respective pixels is a so called delta layout, which makes it possible to blur the contour of each color for color display, which in turn enables improvement in display quality. Traditionally this has been achieved by merely shifting each pixel of the first line by a distance corresponding to ½ pixel with respect to each pixel of the second line. However, with this embodiment, each pixel of the first line is such that the above-mentioned shifting relative to each pixel of the second line is not applied thereto.

Alternatively, this embodiment is specifically arranged so that the drain signal lines DL are curved at an obtuse angle while running between pixels of the first line and then simply extended straightly and thereafter curved at an obtuse angle toward the opposite direction to the curvature while running between pixels of the second line, thereby providing a zigzag pattern. That is, letting the region which is surrounded by the drain signal lines DL with such a pattern and the gate signal lines GL be a pixel region permits achievement of the delta layout of respective pixels. Thus, the drain signal lines DL are capable of preventing their curved portions from curving at right angles, for example, and of having an arrangement that these are curved while having relatively large angles. Accordingly, it becomes possible to significantly suppress occurrence of electrical wire breaking or "open-circuit" at such curved portions.

Such effect can be kept constant without enlarging the width for purposes of opencircuit preclusion at part of the drain signal lines DL within the liquid crystal display section AR. THerefore, the pixel regions will no longer be lessened in area, and it is possible to suppress reduction of the so-called aperture ratio. Further, since a single pixel for color display with three pixels disposed in the delta layout is such that its outer contour forms a complicated polygonal shape, the resultant perceptual pixel contour becomes smooth, which in turn makes it possible to represent the contour of a natural picture more smoothly.

Additionally a planarization film OC which is formed for example of a resin film is formed above the surface of the transparent substrate SUB2 with the color filters CF formed thereon, wherein an orientation film (not shown) is formed on a surface of this planarization film OC.

Embodiment 2.

Figure 4A:
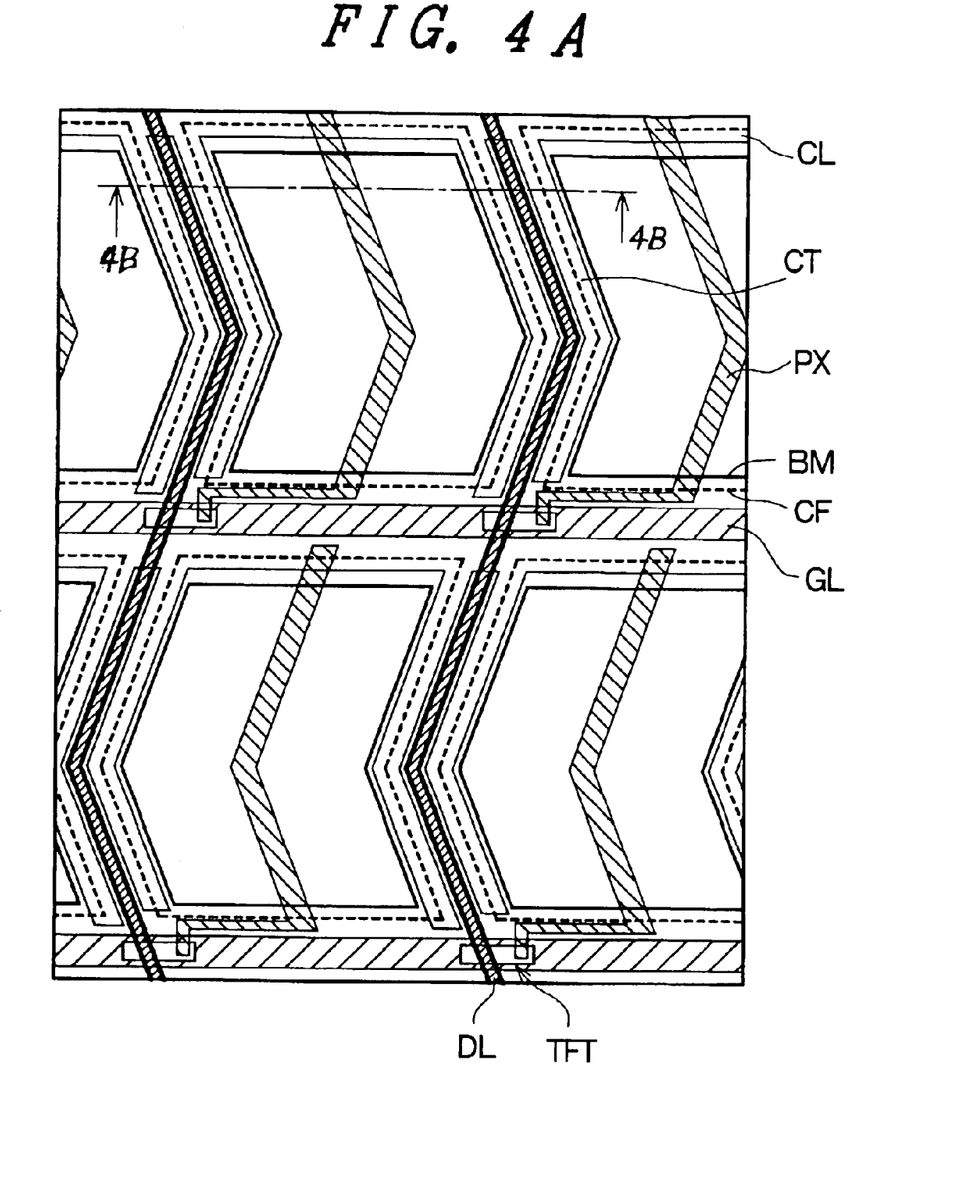
FIG. 4A is a plan view of a pixel of another liquid crystal display device in accordance with the present invention.
Figure 4B:
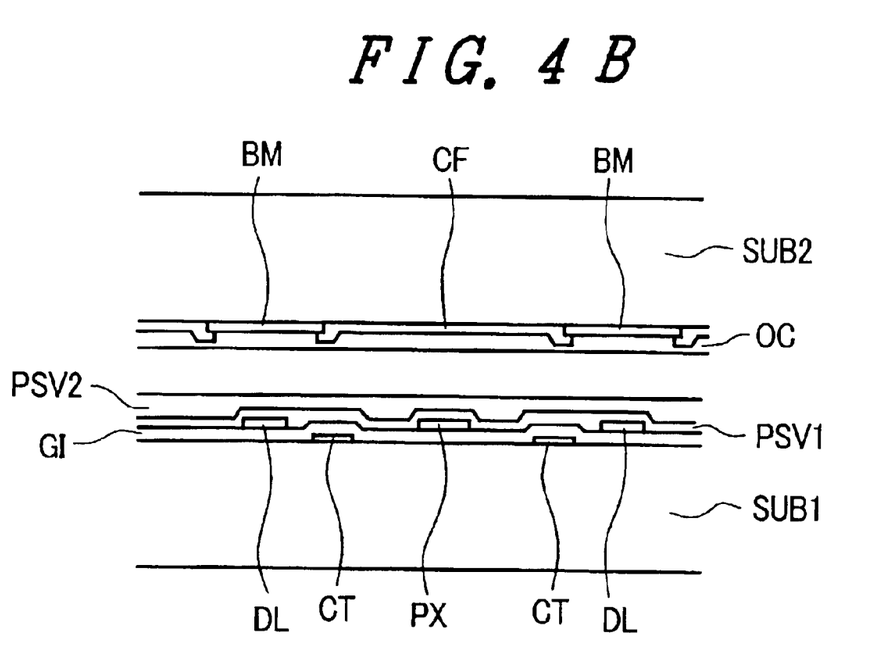
FIG. 4B is a sectional view taken along line 4B—4B of FIG. 4A.

FIG. 4A is a plan view diagram showing an embodiment of another liquid crystal display device in accordance with the present invention, which is a drawing corresponding to FIG. 3A. In addition, FIG. 4B shows a cross-sectional view as taken along line 4B—4B of FIG. 4A.

A different arrangement when compared to the case of FIG. 3A is that the counter electrodes CT are formed at the same layer as the gate signal lines GL, by way of example. In this case, the counter electrodes CT are formed over the pixel regions so that these are in parallel to the gate signal lines GL, wherein the counter electrodes CT are formed integrally with the counter voltage signal lines CL. Additionally the counter electrodes CT are formed in units of respective pixel regions and are formed in parallel to the drain signal lines DL of the zigzag shape.

Embodiment 3.

Figure 5:
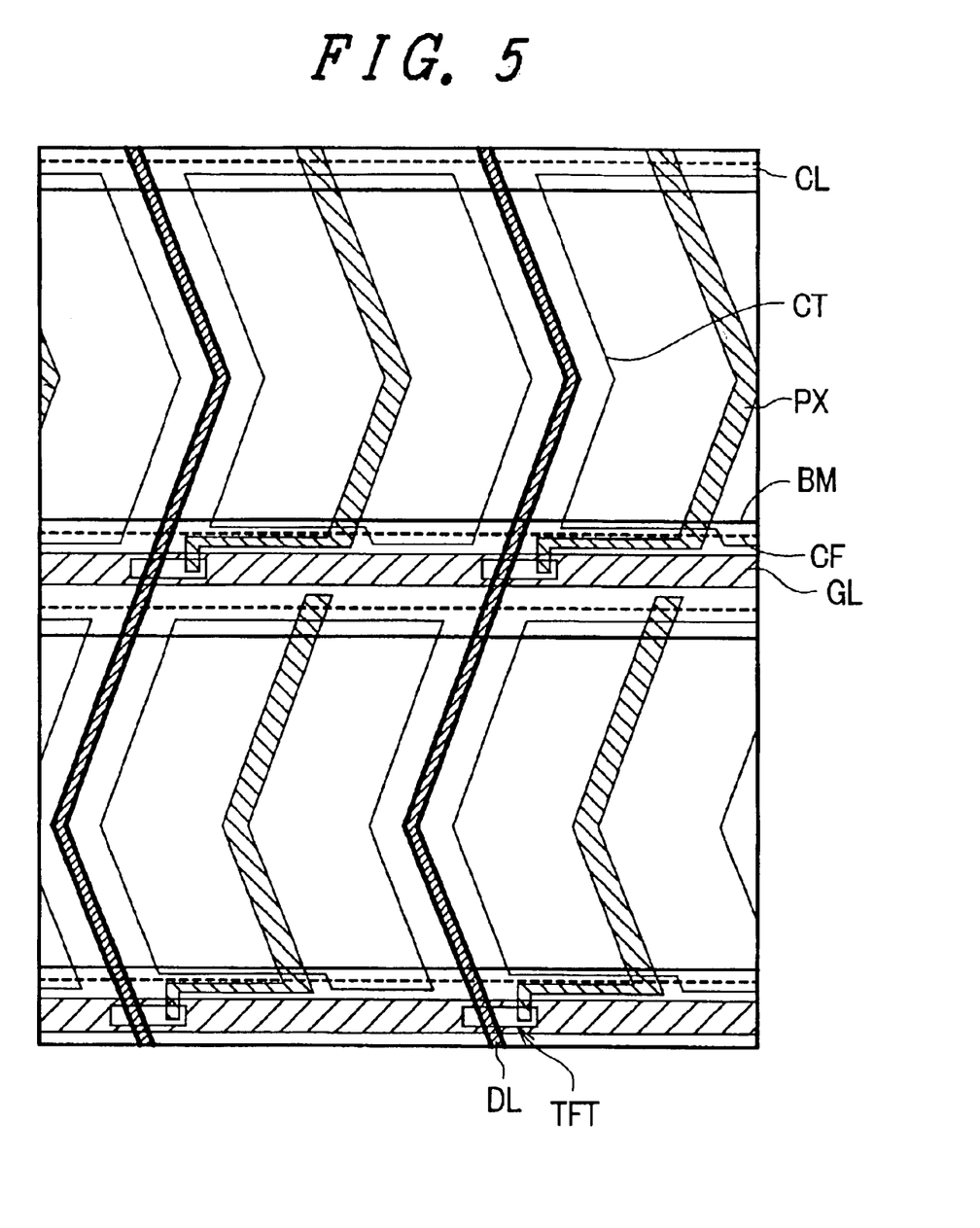
FIG. 5 is a plan view of a pixel of another liquid crystal display device in accordance with the invention.

FIG. 5 is a plan view diagram showing another embodiment of the liquid crystal display device in accordance with the invention, which is a diagram corresponding to FIG. 3A.

A different arrangement from the case of FIG. 3A lies in the black matrix BM, wherein the black matrix BM is formed to oppose its associated gate signal line GL and is not formed to oppose any drain signal line DL. In the configuration of FIG. 5, the counter electrode CT may also function to do double-duty as a black matrix. With such an arrangement, it becomes possible to improve the aperture ratio while at the same time facilitating fabrication of the black matrix BM as required.

Embodiment 4.

Figure 6:
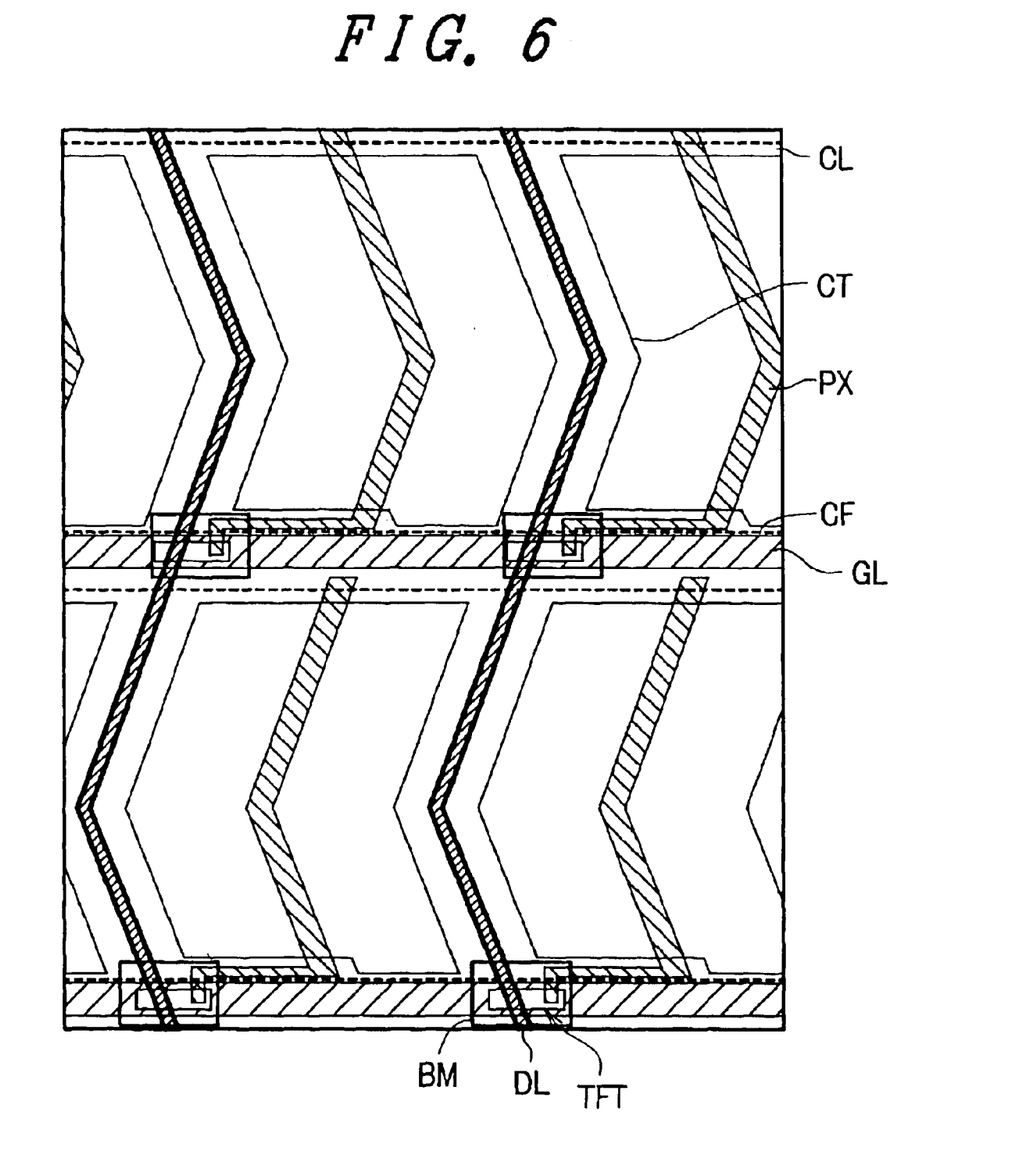
FIG. 6 is a plan view of a pixel of another liquid crystal display device in accordance with the invention.

FIG. 6 is a plan view diagram showing another embodiment of the liquid crystal display device in accordance with the invention, which is a diagram corresponding to FIG. 3A.

A different arrangement from the case of FIG. 3A lies in the black matrix BM, wherein this black matrix BM is formed to oppose the thin-film transistor TFT and is not formed in other regions. It thus becomes possible to improve the aperture ratio while simultaneously facilitating fabrication of the black matrix BM.

Embodiment 5.

Figure 7:
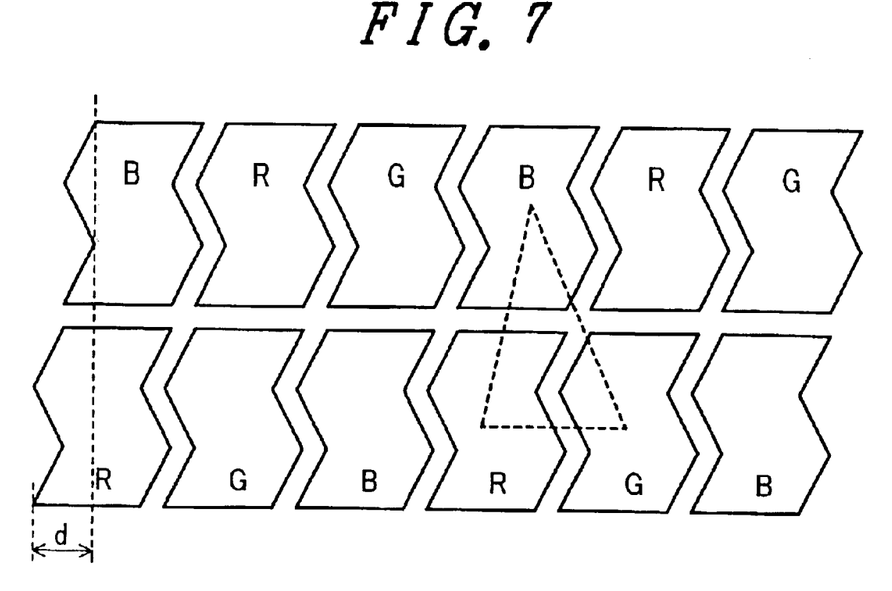
FIG. 7 is a schematic explanation diagram of another liquid crystal display device in accordance with the invention.

FIG. 7 is a plan view diagram showing another embodiment of the liquid crystal display device in accordance with the invention, which is a diagram corresponding to FIG. 1.

A different arrangement from the case of FIG. 1 is that the drain signal line DL is formed into a zigzag shape in such a manner that it is bent two times in mutually different directions at obtuse angels while running between pixels of the first line and then simply extend linearly and thereafter is bent two times in mutually different directions at obtuse angles while running between pixels of an odd-numbered line.

Obviously in the case of using this arrangement also, the same effects are obtainable.

Figure 8:
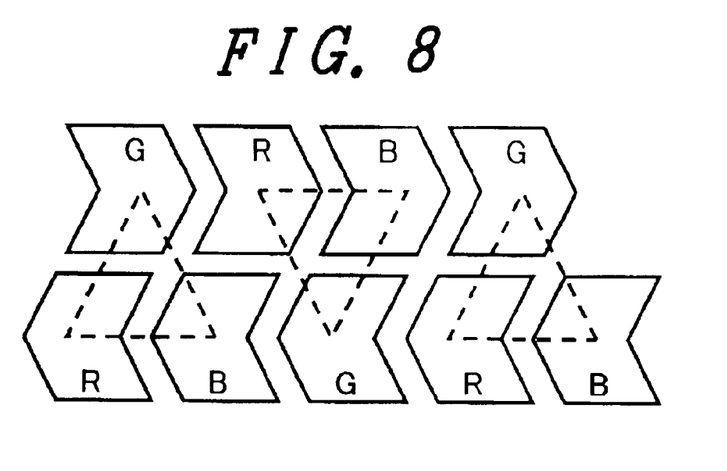
FIG. 8 is a schematic explanation diagram of another liquid crystal display device in accordance with the invention.
Figure 9:
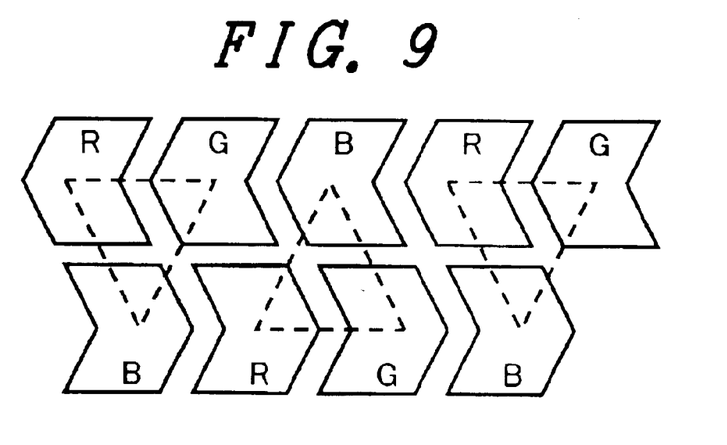
FIG. 9 is a schematic explanation diagram of another liquid crystal display device in accordance with the invention.
Figure 10:
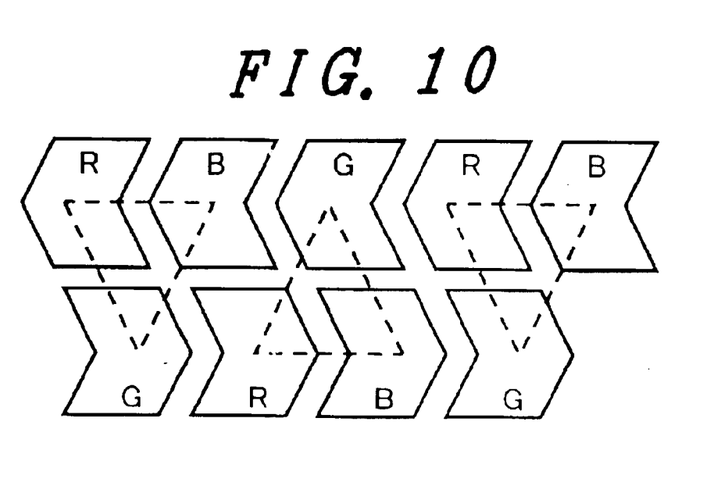
FIG. 10 is a schematic explanation diagram of another liquid crystal display device in accordance with the invention.

FIGS. 8, 9, 10 are plan view diagrams showing different arrangements from the case of FIG. 1.

In the above-described embodiments, the explanation thereof is directed to an LCD of the type employing what is called the in-plane switching (IPS) type LCD, wherein the pixel electrode PX and the counter electrode CT are formed on the transparent substrate SUB1 side for using components of an electric field between them in parallel to the transparent substrate SUB1 to permit the liquid crystals to take behavioral actions. However, this invention is also applicable to the type of LCD using the so-called vertical electric field scheme, wherein a pixel electrode PX made of optically transparent electrical conductor is formed on the transparent substrate SUB1 side while forming a counter electrode CT made of transparent conductor on the transparent substrate SUB2 side.

As apparent from the foregoing explanations, according to the liquid crystal display device in accordance with the present invention, it becomes possible to suppress unwanted wire breaking or an open circuit of the drain signal lines.

What is claimed is:

1. A display device comprising:
   a first gate signal line and a second gate signal line;
   a first drain signal line and a second drain signal line;
   a first pixel region comprising a first thin film transistor connected to the first gate signal line and the first drain signal line; and
   a second pixel region comprising a second thin film transistor connected to the second gate signal line and the first drain signal line; and
   wherein the first drain signal line is curved at a first angle at a center portion of the first drain signal line in the first pixel region and is curved at a second angle at a center portion of the first drain signal line in the second pixel region, the first angle and the second angle being inversed angles with respect to one another.

2. A display device according to claim 1, wherein the first angle and the second angle are equal angles.

3. A display device according to claim 1, wherein the first pixel region and the second pixel region are displayed in different colors.

4. A display device according to claim 3, further comprising a third pixel region with a third thin film transistor connect to the second gate signal line and the second drain signal line, the second drain signal line extending in parallel to the first drain signal line.

5. A display device according to claim 4, wherein the first pixel region, the second pixel region, and the third pixel region form one dot of color display.

6. A display device according to claim 5, wherein the first angle is an obtuse angle and the second angle is an obtuse angle.

7. A display device according to claim 6, wherein the first drain signal line and the second drain signal line include straight line shape portions which cross the second gate line.

8. A display device according to claim 7, wherein the first drain signal line and the second drain signal line include straight line shape portions which cross the first gate line.

9. A display device according to claim 1, wherein first pixel electrode in the first pixel region and second pixel electrode in the second pixel region are elongated in a direction which is parallel to an extension direction of the first drain line.

10. A display device according to claim 9, wherein a first counter electrode in the first pixel region and a second counter electrode in the second pixel region are elongated in a direction which is parallel to an extension direction of the first drain line.

11. A display device according to claim 1, wherein a first edge of a color filter in the first pixel region and a second edge of a color filter in the second pixel region are elongated in a direction which is parallel to an extension direction of the first drain line.

12. A display device according to claim 11, wherein a first edge of a black matrix in the first pixel region and a second edge of a black matrix in the second pixel region are elongated in a direction which is parallel to an extension direction of the first drain line.

13. A display device comprising:
   a first gate signal line and a second gate signal line;
   a first drain signal line and a second drain signal line;
   a first pixel region comprising a first thin film transistor connected to the first gate signal line and the first drain signal line;
   a second pixel region comprising a second thin film transistor connected to the second gate signal line and the first drain signal line;
   wherein the first drain signal line is curved only once at a first angle in the first pixel region and is curved only once at a second angle in the second pixel region, the first angle and the second angle being inversed angles with respect to one another.

14. A display device according to claim 13, wherein the first angle and the second angle are equal angles.

15. A display device according to claim 13, wherein the first pixel region and the second pixel region are displayed in different colors.

16. A display device according to claim 15, further comprising a third pixel region with a third thin film transistor connect to the second gate signal line and the second drain signal line, the second drain signal line extending in parallel to the first drain signal line.

17. A display device according to claim 16, wherein the first pixel region, the second pixel region, and the third pixel region form one dot of color display.

18. A display device according to claim 17, wherein the first angle is an obtuse angle and the second angle is an obtuse angle.

19. A display device according to claim 18, wherein the first drain signal line and the second drain signal line include straight line shape portions which cross the second gate line.

20. A display device according to claim 19, wherein the first drain signal line and the second drain signal line include straight line shape portions which cross the first gate line.

21. A display device according to claim 13, wherein first pixel electrode in the first pixel region and second pixel electrode in the second pixel region are elongated in a direction which is parallel to an extension direction of the first drain line.

22. A display device according to claim 21, wherein a first counter electrode in the first pixel region and a second counter electrode in the second pixel region are elongated in a direction which is parallel to an extension direction of the first drain line.

23. A display device according to claim 13, wherein a first edge of a color filter in the first pixel region and a second edge of a color filter in the second pixel region are elongated in a direction which is parallel to an extension direction of the first drain line.

24. A display device according to claim 23, wherein a first edge of a black matrix in the first pixel region and a second edge of a black matrix in the second pixel region are elongated in a direction which is parallel to an extension direction of the first drain line.

* * * * *